(12) United States Patent
Zafiroglu

(10) Patent No.: US 7,622,408 B2
(45) Date of Patent: Nov. 24, 2009

(54) FABRIC-FACED COMPOSITES AND METHODS FOR MAKING SAME

(75) Inventor: Dimitri Peter Zafiroglu, Centreville, DE (US)

(73) Assignee: DZS, LLC, Midlothian, VA (US)

( * ) Notice: Subject to any disclaimer, the term of this patent is extended or adjusted under 35 U.S.C. 154(b) by 37 days.

(21) Appl. No.: 10/611,769

(22) Filed: Jul. 1, 2003

(65) Prior Publication Data
US 2005/0003141 A1    Jan. 6, 2005

(51) Int. Cl.
*B32B 27/12*   (2006.01)
*D04H 1/00*    (2006.01)
*D04H 1/46*    (2006.01)
*D04H 1/48*    (2006.01)

(52) U.S. Cl. ............ 442/402; 442/383; 442/388; 28/107; 156/148

(58) Field of Classification Search ............ 428/95; 442/402, 383, 388; 28/107; 156/148
See application file for complete search history.

(56) References Cited

U.S. PATENT DOCUMENTS

| | | | |
|---|---|---|---|
| 1,798,277 A * | 3/1931 | Schmiedel | 112/411 |
| 2,317,595 A | 4/1943 | Faris | |
| 2,550,686 A | 5/1951 | Goldman | |
| 2,688,578 A | 9/1954 | Teague | |
| 2,748,446 A * | 6/1956 | Mason | 428/87 |
| 2,787,571 A | 4/1957 | Miller | |
| 2,810,950 A | 10/1957 | Rice | |
| 2,917,421 A | 12/1959 | Miller | |
| 3,015,149 A | 1/1962 | Foster et al. | |
| 3,166,465 A | 1/1965 | Rahmes | |
| 3,186,886 A | 6/1965 | Etchison et al. | |
| 3,245,854 A | 4/1966 | Etchison et al. | |
| 3,347,736 A * | 10/1967 | Sissons | 428/92 |
| 3,476,636 A | 11/1969 | Crosby | |
| 3,506,530 A | 4/1970 | Crosby | |
| 3,620,890 A | 11/1971 | Kemmler | |

(Continued)

FOREIGN PATENT DOCUMENTS

EP    0547533    *   6/1993

(Continued)

OTHER PUBLICATIONS

International Search Report of PCT/US04/23032.

(Continued)

*Primary Examiner*—D. Lawrence Tarazano
*Assistant Examiner*—Matthew D Matzek
(74) *Attorney, Agent, or Firm*—The H.T. Than Law Group

(57) ABSTRACT

The present invention is directed to multiple layer composites suitable for use as wall and floor coverings, among other uses, that provide a strong durable structure and a soft textile or fabric face. The composite includes a face layer bonded to an adhesive layer such that the adhesive layer penetrates into the face layer. The face layer can have legs extending there from, and such legs are anchored by the adhesive layer to provide stronger attachment between the adhesive layer and the face layer. A backing layer may also be provided in contact with the adhesive layer such that the adhesive layer also embeds into the backing layer, and the legs extending from the face layer may penetrate into the backing layer.

25 Claims, 11 Drawing Sheets

U.S. PATENT DOCUMENTS

| | | |
|---|---|---|
| 3,669,818 A | 6/1972 | Stark |
| 3,687,796 A | 8/1972 | Stumpf et al. |
| 3,695,987 A | 10/1972 | Wisotzky et al. |
| 3,708,384 A | 1/1973 | Carpenter |
| 3,819,465 A | 6/1974 | Parsons et al. |
| 3,834,978 A | 9/1974 | Nisenson et al. |
| 3,856,598 A | 12/1974 | Gregorian et al. |
| 3,860,469 A | 1/1975 | Gregorian et al. |
| 3,867,243 A | 2/1975 | Stoller |
| 3,922,454 A | 11/1975 | Roecker |
| 3,924,040 A * | 12/1975 | Addie et al. ............. 428/141 |
| 3,943,018 A | 3/1976 | Petry et al. |
| 3,947,306 A | 3/1976 | Haemer |
| 3,950,582 A | 4/1976 | Keuchel |
| 4,013,407 A | 3/1977 | Ray, Jr. |
| 4,018,957 A | 4/1977 | Werner et al. |
| 4,035,215 A | 7/1977 | Goldstone |
| 4,098,629 A | 7/1978 | Goldstone |
| 4,138,521 A | 2/1979 | Brown |
| 4,159,360 A | 6/1979 | Kim |
| 4,172,170 A | 10/1979 | Foye |
| 4,197,343 A | 4/1980 | Forsythe |
| 4,217,383 A | 8/1980 | Patterson et al. |
| 4,278,482 A | 7/1981 | Poteet et al. |
| 4,324,824 A | 4/1982 | Narens et al. |
| 4,371,576 A | 2/1983 | Machell |
| 4,389,442 A | 6/1983 | Pickens, Jr. et al. |
| 4,389,443 A | 6/1983 | Thomas et al. |
| 4,390,582 A | 6/1983 | Pickens, Jr. et al. |
| 4,426,415 A | 1/1984 | Avery |
| 4,495,133 A | 1/1985 | Sugihara et al. |
| 4,576,840 A * | 3/1986 | Murata et al. .............. 428/16 |
| 4,582,554 A | 4/1986 | Bell et al. |
| 4,588,629 A * | 5/1986 | Taylor ..................... 428/88 |
| 4,643,930 A | 2/1987 | Ucci |
| 4,645,699 A * | 2/1987 | Neveu ..................... 428/95 |
| 4,871,603 A | 10/1989 | Malone |
| 4,888,228 A * | 12/1989 | Sidles ..................... 428/86 |
| 4,892,777 A | 1/1990 | Wald et al. |
| 4,919,743 A | 4/1990 | Johnston et al. |
| 4,942,074 A | 7/1990 | Bell et al. |
| 4,988,551 A | 1/1991 | Zegler |
| 5,075,142 A * | 12/1991 | Zafiroglu ................. 428/36.1 |
| 5,198,277 A | 3/1993 | Hamilton et al. |
| 5,283,097 A * | 2/1994 | Gillyns et al. ............ 428/91 |
| 5,370,757 A | 12/1994 | Corbin et al. |
| 5,399,409 A | 3/1995 | Whiteman |
| 5,415,925 A | 5/1995 | Austin et al. |
| 5,436,064 A | 7/1995 | Schnegg et al. |
| 5,443,881 A | 8/1995 | Higgins et al. |
| 5,464,677 A | 11/1995 | Corbin et al. |
| 5,560,972 A | 10/1996 | Blakely et al. |
| 5,578,357 A | 11/1996 | Fink |
| 5,672,222 A * | 9/1997 | Eschenbach ............. 156/148 |
| 5,728,444 A | 3/1998 | Fink |
| 5,747,133 A | 5/1998 | Vinod et al. |
| 5,763,040 A * | 6/1998 | Murphy et al. ............ 428/96 |
| 5,879,779 A * | 3/1999 | Zafiroglu ................. 428/102 |
| 5,882,770 A * | 3/1999 | Makansi .................. 428/156 |
| 5,902,663 A * | 5/1999 | Justesen et al. ........... 428/95 |
| 5,939,166 A | 8/1999 | Cheng et al. |
| 5,962,101 A | 10/1999 | Irwin et al. |
| 5,965,232 A | 10/1999 | Vinod |
| 6,051,300 A * | 4/2000 | Fink ....................... 428/95 |
| 6,063,473 A | 5/2000 | Zafiroglu |
| 6,162,748 A | 12/2000 | Schilling et al. |
| 6,269,759 B1 * | 8/2001 | Zafiroglu et al. ......... 112/80.01 |
| 6,503,595 B1 * | 1/2003 | Kim et al. ................ 428/97 |
| 6,899,923 B2 * | 5/2005 | Kimbrell et al. .......... 427/381 |
| 2002/0028624 A1 * | 3/2002 | Mizutani et al. .......... 442/394 |
| 2002/0119281 A1 | 8/2002 | Higgins et al. |
| 2002/0132085 A1 | 9/2002 | Higgins et al. |
| 2003/0099810 A1 * | 5/2003 | Allison et al. ............. 428/95 |
| 2003/0152743 A1 * | 8/2003 | Matsunaga et al. ........ 428/97 |
| 2003/0232171 A1 * | 12/2003 | Keith et al. ............... 428/95 |

FOREIGN PATENT DOCUMENTS

| | | | |
|---|---|---|---|
| EP | 0547533 | * | 6/1999 |
| EP | 1026195 | | 9/2000 |
| EP | 1026311 | | 9/2000 |
| FR | 2160631 | | 6/1973 |
| FR | 2629678 | | 10/1989 |
| GB | 1080046 | | 8/1967 |
| GB | 1128801 | | 10/1968 |
| GB | 1194027 | | 6/1970 |
| GB | 1194886 | * | 6/1970 |
| GB | 2185213 A | | 7/1987 |
| WO | WO 99/19577 A1 | | 4/1999 |

OTHER PUBLICATIONS

Written Opinion of the International Searching Authority of PCT/US04/23032.

* cited by examiner

FABRIC-FACED COMPOSITES AND METHODS FOR MAKING SAME

TECHNICAL AREA

The present invention relates to fabric-faced laminates for use as floor coverings.

BACKGROUND

Floor coverings are generally selected based upon a combination of factors including aesthetic features such as the look and feel of the floor covering and functional qualities such as retention of surface appearance, stain resistance, moisture resistance, ease of cleaning, and resistance to collection of dirt. For example, floor covering installations in high traffic areas or areas prone to moisture and stains such as kitchens generally use solid surface cover materials for the flooring or interior wall coverings such as wood, metal, marble, ceramic tile, vinyl or rubber. These products retain their surface appearance after heavy use and they are simple to keep clean. They also are resistant to stains and moisture, and less prone to harboring bacterial growth. However, these products lack the textile hand, softness or sound dampening qualities of textile products.

In installations where aesthetic qualities such as texture and softness are desired, products such as tufted, knit, knotted or woven structures, including velour or velvet are used. These products provide softness and cushion, a soft textile hand and a degree of abrasion and wear resistance. Compared to rigid solid surfaced products, however, these floor coverings are less durable, tend to lose their texture with heavy use, because the pile tends to mat or to be crushed with heavy traffic, tend to collect dust and dirt, provide spaces that allow the growth of bacteria, and are difficult to clean and sanitize.

Attempts have been made to create products having both the desired functional qualities of solid surface materials and the aesthetic qualities of textile or fabric materials. For example, hybrid structures with partially fibrous and partially solid faces are disclosed in U.S. Pat. No. 3,943,018. These hybrid structures, however, merely reduce but do not eliminate the limitations of regular tufted, velour, or flocked textile surfaces.

Other attempts provide flat or profiled, e.g., sculpted, surfaces containing fibrous layers impregnated with a plastic matrix. Examples of fibrous layers impregnated with a plastic matrix are disclosed in U.S. Pat. Nos. 4,035,215, 4,098,629, and 6,063,473. These floor coverings generally have surfaces with a semi-fibrous feel, and the spaces between the fibers may be sufficiently sealed to prevent bacterial penetration and dirt collection. In addition, these floor coverings also provide a higher matting resistance than regular upright-oriented fiber structures. However, these floor covering products largely have a stiff leathery appearance rather than a soft textile feel, and the cost of preparing dimensionally-stable dense fibrous products, combined with the cost of impregnating and heat setting can be very high.

U.S. Pat. No. 3,860,469 discloses another technique to produce inexpensive, dirt and bacterial growth resistant, and abrasion resistant surface covering materials with a textile fiber appearance in which flat or textured film-like skins are placed on top of a pile-like surface. The resultant floor covering products combine the qualities of carpet with the solidity of vinyl or rubber, but lack the textile quality and aesthetics of carpets.

Other attempts assemble a basically flat textile fabric over a sublayer of adhesive backed with various layers of sub-surface reinforcement. For example, International Patent Publication No. WO 99/19557 discloses a woven face fabric backed by reinforcing layers, and U.S. Pat. No. 5,965,232 discloses a decorative fabric attached to dimensionally-stabilizing or cushioning layers. The fabric is further surface-stabilized. Laminates having a flat fabric face, however, tend to delaminate or fray at the edges unless the fabric is thoroughly impregnated with adhesives. Unfortunately, impregnation with adhesives adversely affects the textile feel and cushioning quality of the laminate.

Because of these shortcomings, the need remains to provide a surface covering material that combines the desirable properties of both solid surface coverings and textile-type coverings into a single product. Suitable surface coverings would have at least some of the desired properties of surface stability, edge fray resistance, thermal stability, structural stability, dimensional stability, dirt resistance, bacteria resistance, soft textile hand, cushioning, and appearance extending over a full spectrum of tufted, knit, non-woven, woven, velour and velvet products.

SUMMARY OF THE INVENTION

Composite materials in accordance with the present invention utilize a fibrous face layer combined with an adhesive layer to form a multi-layer structure. In order to provide the desired level of surface stability, the surface fibers of the fibrous face layer form loops, and the loops descend into the adhesive layer and are anchored in the adhesive layer. The loops are densely spaced and shallow. Although any portion of the fibers or legs of the looped fibers in the face layer can be dispersed in the adhesive, a significant amount or substantially all of the descending fibers are dispersed in the adhesive layer, which is in contact with the face layer. A characteristic of this invention is that short and densely spaced fiber loops embedded in adhesive provide improved surface stability and retention of appearance under repeated loading. Another characteristic is the resistance to cut-edge fraying.

In order to maintain the desired aesthetic qualities of the composite material while achieving increased surface stability, the amount of penetration of the adhesive into the face layer is controlled. The adhesive layer is not allowed to penetrate into the top portion of the face layer. Therefore, the top of the face layer maintains its textile feel.

Various types of fibrous face layer constructions can be used depending upon the aesthetics desired and a balance of cost vs. performance. Regardless of the type of fibrous layer used, all of the embodiments and arrangements illustrated herein have a relatively fine and dense surface texture and they can also be embossed to produce three-dimensional textured products. In addition, a three layer composite structure can be provided wherein a backing layer is also bonded or laminated to the adhesive layer such that the adhesive layer is disposed between the face layer and the backing layer. Added structural rigidity is provided by having the adhesive layer penetrate into the backing layer as well.

To prepare a composite material in accordance with the present invention, a fibrous face layer is arranged to have a relatively smooth top surface with a high density of fiber loop legs extending down through the thickness of the face layer to the bottom surface. An adhesive layer is brought into direct contact with the bottom surface of the face layer and embedded into the face layer to cause the adhesive to penetrate partially into the thickness of the face layer. In order to embed the adhesive layer in the face layer, pressure and heat can be applied. For a three layer laminate, the backing layer can be brought into direct contact with the adhesive layer before the adhesive layer is embedded into the face layer, allowing the adhesive layer to simultaneously penetrate into the backing layer. The adhesive layer may be pre-integrated onto the face layer or onto the backing layer before lamination. The adhesive layer may also contain non-adhesive reinforcing or blended components. The backing layer may also contain adhesive components, which may replace the need for a separate adhesive layer, if the adhesive is present in sufficient quantity to anchor and envelope the legs of the surface fiber loops descending into it.

DETAILED DESCRIPTION

Figure 1:
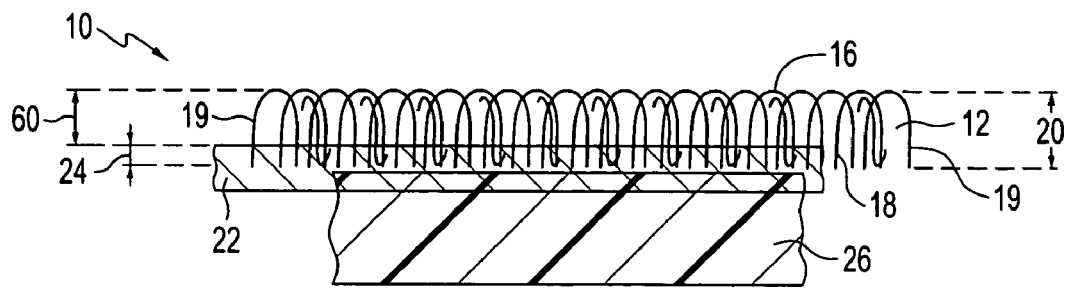
FIG. 1 is a schematic representation of a three layer embodiment of the composite material in accordance with the present invention.
Figure 2:
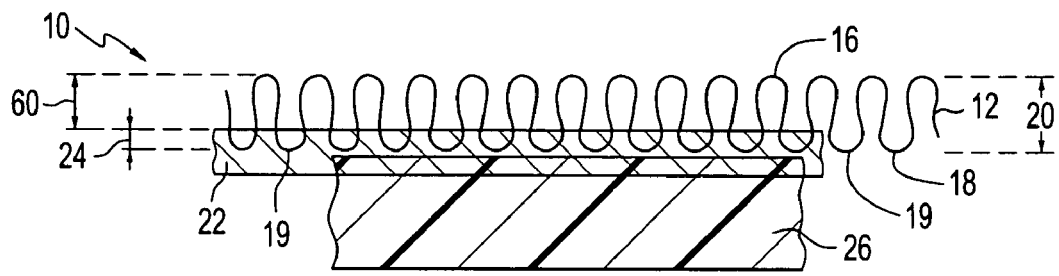
FIG. 2 is schematic representation of another three layer embodiment of the composite material.

Referring initially to FIGS. 1-4, a fabric-faced composite material 10 in accordance with the present invention includes a face layer 12 containing a plurality of fibers. Suitable fabrics for face layer 12 include, but are not limited to, woven, non-woven, knit, stitchbonded or gathered structures. The face layer 12 includes top side or surface 16 and bottom side or surface 18 opposite top surface 16, defining thickness 20 of face layer 12 between them. Top surface 16 is the surface or face of composite material 10 that is exposed when the laminate 10 is installed, for example on a substrate in a flooring application.

Composite material 10 also includes adhesive layer 22 disposed adjacent face layer 12 in direct contact with bottom surface 18. Preferably, adhesive layer 22 is continuous or is composed of a single, smooth uninterrupted surface. Alternatively, adhesive layer 22 has a substantially constant thickness. Adhesive layer 22 can contain thermoplastic or thermosetting adhesives. Suitable materials for adhesive layer 22 include polyethylene, polypropylene, copolyester, copolyamide and combinations thereof. Suitable basis weights for adhesive layer 22 range from about 3 oz/yd$^2$ to about 14 oz/yd$^2$, preferably about 4 oz/yd$^2$ to about 10 oz/yd$^2$.

Adhesive layer 22 penetrates into face layer 12 distance 24, which is sufficient to anchor face layer 12 and adhesive layer 22 together. In one embodiment, distance 24 ranges from about ¼ to about ¾ of thickness 20 of face layer 12. Preferably, adhesive layer 22 does not penetrate completely through to top surface 16 of face layer 12 in order to preserve the soft, textile feel of composite material 10. The depth of penetration of adhesive layer 22 into face layer 12 can be controlled by varying the construction of face layer 12, the construction of adhesive layer 22 or the process conditions used to embed adhesive layer 22 into face layer 12. In one embodiment, the viscosity of adhesive layer 22 is adjusted to limit the depth of penetration to within the lower ¾ of face layer 12 so that at least the upper ¼ of face layer 12 is free of adhesive. The average height 60 of the face layer above the average level of adhesive penetration varies between about 0.5 mm and about 2.0 mm, and the basis weight is in the range of about 100 grams/m² to about 500 grams/m².

In general, the penetration of adhesive layer 22 into face layer 12 increases the amount or surface area of the adhesive layer that is in contact with the structure or fibers of the face layer 12. Increasing the surface area contact between adhesive layer 22 and face layer 12 increases the strength of the bond between the two layers and the overall rigidity and strength of the resulting two layer laminate. Overall, this arrangement yields a composite material 10 with improved structural strength and rigidity and a pleasurable soft texture.

Although composite materials 10 in accordance with the present invention can contain just two layers, face layer 12 and adhesive layer 22, additional layers may also be included. In three layer arrangements as illustrated in FIGS. 1-4, composite material 10 also includes backing layer 26 in direct contact with adhesive layer 22. Backing layer 26 is disposed such that adhesive layer 22 is disposed between backing layer 26 and face layer 12. In order to provide increased structural rigidity, adhesive layer 22 also preferably penetrates or extends into backing layer 26. Additional layers such as a gas permeable layer, bactericide layer or the like can also be added. As used herein, backing layer includes any layer, composite or laminate being attached to composite 10. Composite 10 can also be embossed and simultaneously bonded and/or laminated to any backing layer.

In either the two layer or three layer embodiments of the current invention, the layers are laminated together by applying pressure and heat, preferably from top surface 16, to cure or melt adhesive layer 22 and to control the depth of adhesive penetration. For thermosetting adhesives, adhesive layer 22 can be applied to bottom surface 18 of face layer 12 or to the top of backing layer 26 and the resultant structure can be cured under pressure with a hot tool at a temperature that cures adhesive layer 22 but leaves the fibers in face layer 12 and backing layer 26 intact. For thermoplastic adhesives, adhesive layer 22 is preferably pre-attached to bottom surface 18 of face layer 12 or the top face of backing layer 26 and preheated or pre-melted in-situ, for example by applying radiant heat, before all of the layers are laminated together under pressure. In one embodiment, adhesive layer 22 is preheated before applying pressure to adhesive layer 22, face layer 12 or backing layer 26.

A wide variety of materials can be used as backing layer 26 depending upon the desired thickness, strength and flexibility of three layer composite material 10. In one embodiment, backing layer 26 is a pre-needled layer of higher-denier fibers of up to about 20 denier per filament or fiber and weighing at least about 10 oz/yd². In another embodiment, backing layer 26 is a needled felt of reclaimed carpet fibers. In yet another embodiment, backing layer 26 is a used tufted carpet.

Although the fibers in face layer 12 at bottom surface 18 are spaced from backing layer 26, these fibers can alternatively extend completely through adhesive layer 22 and be in contact with backing layer 26. In addition, these fibers can extend completely through the adhesive layer 22 and into the backing layer 26 and even through the entire thickness of backing layer 26. These arrangements can be achieved by controlling the composition of adhesive layer 22 and the process used to laminate the three layers together as discussed below. In addition, separate processes, for example needle punching, can be used to interlock the fibers of face layer 12 into adhesive layer 22 and backing layer 26.

In general, the bottom surface 18 of fibrous face layer 12 includes a plurality of legs 19 dependent there from. Legs 19 are anchored into adhesive layer 22 in composite 10 and in some embodiments extend into backing layer 26. Legs 19 include structures of face layer 12 such as free fiber ends of needle punched or spunlaced/hydraulically needled loops, FIG. 1, undulating gathered loops of stitchbonded or pattern bonded fabrics, FIG. 2, pile loops of knit fabrics, FIG. 3, and cut and raised free fiber ends of knit and woven fabrics, FIG. 4. The term "legs" or "legs formed from loops" as used herein includes all of these structures or portions thereof, and also includes any remaining fiber portions of the loops that have been cut to form piles. Processes such as laminating using pressure and heat and needle punching are used to anchor legs 19 into adhesive layer 22.

In one embodiment in accordance with the present invention as shown in FIGS. 5-8, composite material 10 includes needled, non-woven face layer 12 containing a plurality of fibers 14. In one embodiment, non-woven face layer 12 contains a web of staple fibers. Suitable staple fibers range from about 0.5 denier to about 5 denier per filament or fiber and have a length ranging from about 0.5 inches to about 3 inches, forming a non-woven web having a weight ranging from about 3 oz/yd² to about 14 oz/yd².

Figure 5:
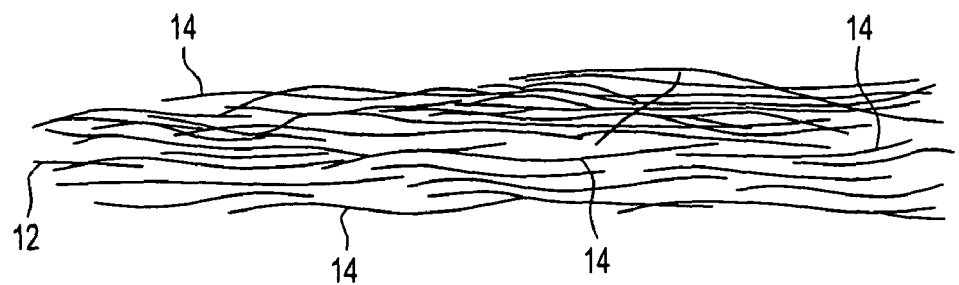
FIG. 5 is a schematic representation of a non-woven fabric layer.
Figure 6:
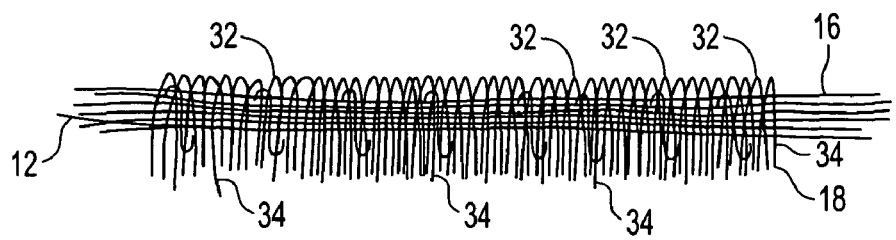
FIG. 6 is schematic representation of a needle punched non-woven fabric layer.

Although fibers 14 are initially arranged in a generally planar pattern in face layer 12 as illustrated in FIG. 5, a portion of fibers 14 are needle punched or hydraulically needled (spunlaced) toward bottom surface 18 as illustrated in FIG. 6. When mechanical needle punching is used, the needling density is at least over 500 penetrations per square inch (ppsi) and preferably over 1,000 ppsi. The web of fibers 14 is needled from top surface 16 with a relatively large number of needle penetrations per unit area. Generally, the needle punch density is from about 250 needles/in² to about 2000 needles/in². In one embodiment, web 14 has a needle punch density of at least about 250 needles/in². Alternatively, the needle punch density is at least about 500 needles/in². Preferably, the needle punch density is at least 1000 needles/in².

The product of FIG. 5 can also be formed using hydraulic needling (spunlacing). Preferably, the needled web consists of shorter fibers, up to about 2 inches long, preferably less than about 1 inch and more preferably shorter fibers, including pulps. Also, preferably the needling jets are relatively not dense, e.g., less than 50 penetrations/inch. The needling is performed substantially or totally from the top, and the needling energy is relatively high, e.g., at least 20 HP·HR/lb.

Figure 7:
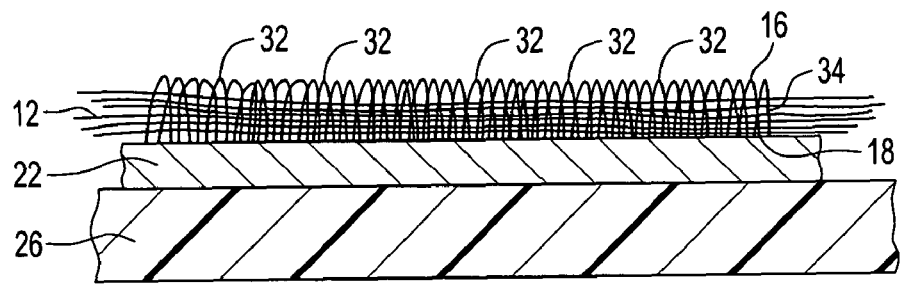
FIG. 7 is a schematic representation of a needle punched non-woven face layer embodiment of the present invention before lamination.
Figure 8:
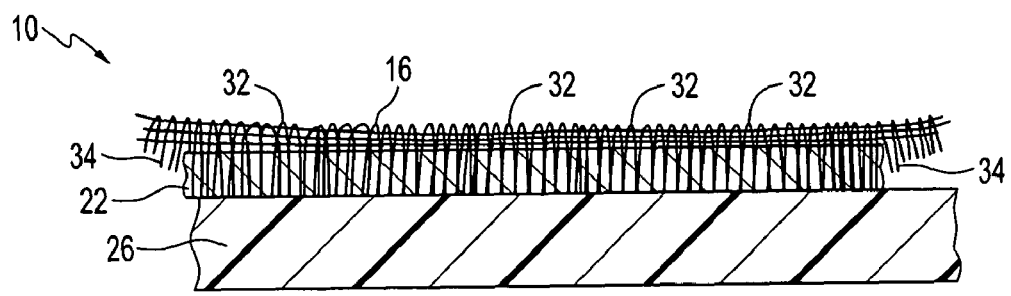
FIG. 8 is schematic representation of a needle punched non-woven face layer embodiment of the present invention after lamination.

In this embodiment, face layer 12 is densified and acquires a relatively smooth top surface or upper face 16 containing a plurality of loops 32 facing downward. Each loop 32 contains free fiber ends or legs 34 that descend through face layer 12 and terminate at bottom surface 18. In order to form a three layer configuration of this embodiment, adhesive layer 22 is placed in direct contact with bottom side 18 and backing layer 26 such that adhesive layer 22 is disposed between face layer 12 and backing layer 26 as is shown in FIG. 7. After activation of adhesive layer 22 as shown in FIG. 8, adhesive layer 22 penetrates partially into face layer 12 and backing layer 26, laminating all three layers together. Needled fibers 14 are anchored in adhesive layer 22 at legs 34 of loops 32. The upper strata or layers of face layer 12 remain free of adhesive from adhesive layer 22.

Preferably, in this embodiment, the selected non-woven face layer 12, FIG. 5, is needle punched or spunlaced (hydraulically needled) to produce a plurality of free fiber ends 34 at bottom surface 18, FIG. 6. Continuous adhesive layer 22 is then placed in direct contact with bottom surface 18, FIG. 7, and adhesive layer 22 is embedded into face layer 12 a sufficient distance to anchor face layer 12 in adhesive layer 22. In order to embed adhesive layer 22 into face layer 12, adhesive layer 22 is heat activated. Pressure may also be applied to top surface 16 of face layer 12. A variety of methods can be used to apply heat and pressure to top surface 16 such as contacting top surface 16 with one or more heated pressure plates (not shown). Adhesive layer 22 may also be preheated as for example with radiant heat before placing face layer 12 upon it.

Figure 9:
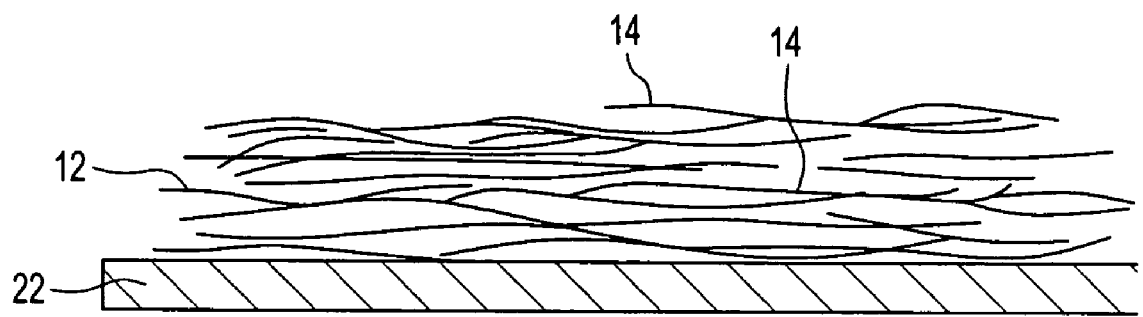
FIG. 9 is a schematic representation of a non-woven fabric layer in contact with an adhesive layer.
Figure 10:
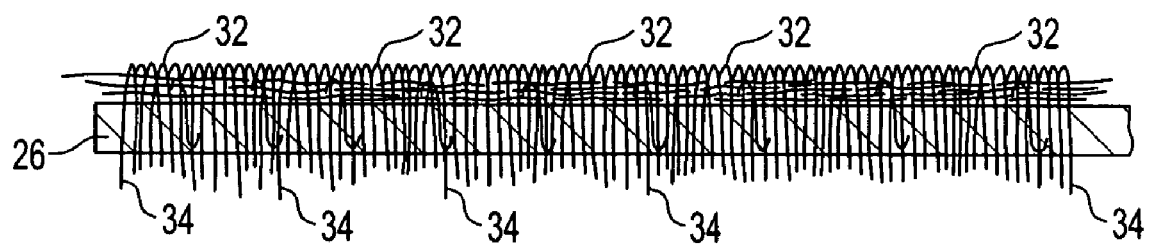
FIG. 10 is a schematic representation of a non-woven fabric layer needle punched through an adhesive layer.

Referring to FIGS. 9 and 10, face layer 12 is brought into direct contact with adhesive layer 22 before face layer is needle punched, FIG. 9. Then, face layer 12 is needle punched so that free fiber ends 34 penetrate into and in some cases completely through adhesive layer 22. Spunlacing or hydraulic needling is not applicable with the embodiment shown in FIGS. 9 and 10. In this embodiment, adhesive layer 22 may constitute a low-melt thermoplastic sheet or layer, e.g. polyethylene, polypropylene, low-melt copolyester or copolyamide. This sheet or layer can be in the form of a film or fabric, for example a non-woven fabric, or a layer of low-melt fibers. After the fibers are needle punched into adhesive layer 22, adhesive layer 22 is heat activated and laminated to face layer 12 using pressure as described above.

Figure 11:
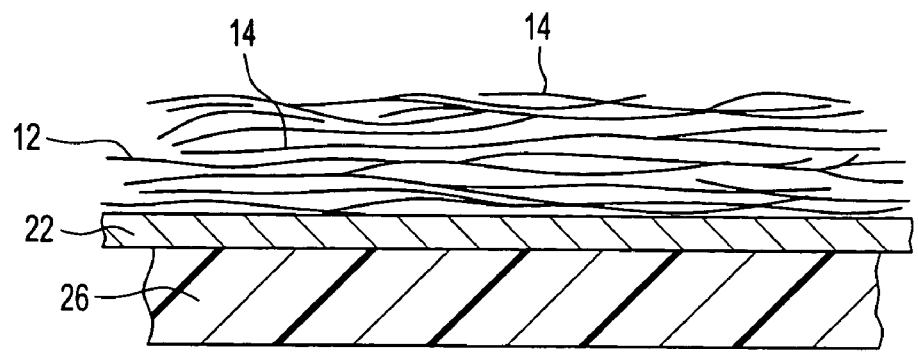
FIG. 11 is a schematic representation of a non-woven fabric layer in combination with an adhesive layer and a backing layer.
Figure 12:
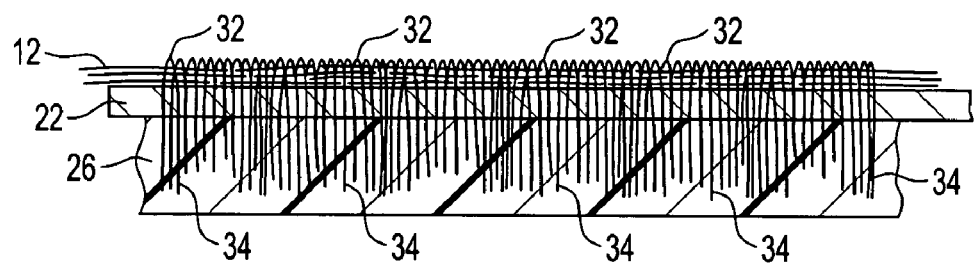
FIG. 12 is a schematic representation of a non-woven fabric layer needle punched through an adhesive layer and a backing layer before lamination.
Figure 13:
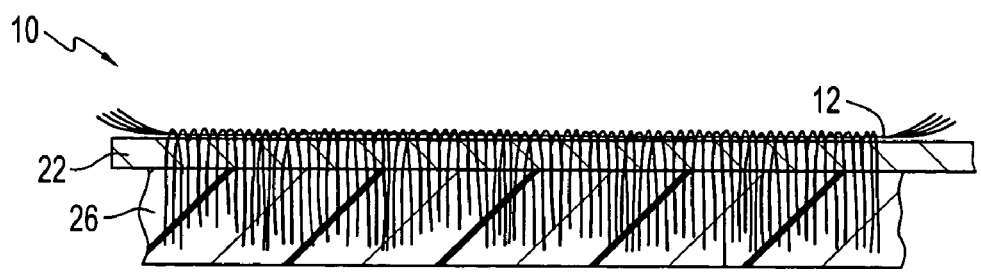
FIG. 13 is a schematic representation of a non-woven fabric layer needle punched through an adhesive layer and a backing layer after lamination.

Referring to FIGS. 11-13, in addition to bringing adhesive layer 22 into contact with face layer 12 prior to needle punching, backing layer 26 can also be brought into contact with adhesive layer 22 before needle punching. In this three layer embodiment, backing layer 26 is placed in direct contact with adhesive layer 22 such that adhesive layer 22 is disposed between backing layer 26 and face layer 12 (FIG. 11). Then, face layer 12 is needle punched resulting in fiber ends 34 that extend completely through adhesive layer 22 and into backing layer 26 (FIG. 12). The composite material 10 is then finished by heat activating adhesive layer 22 in-situ with or without substantial applied pressure (FIG. 13). In this embodiment, backing layer 26 is preferably a heavier and more resilient structure than face layer 12 so that backing layer 26 does not collapse as a result of the dense needling action.

Referring to FIGS. 14-17, another embodiment of the composite material 10 in accordance with the present invention is illustrated wherein face layer 12 is an undulated, gathered or folded structure with the plurality of fibers disposed in a gathered layer forming a plurality of downwardly facing loops 40 disposed at top surface 16 and descending from top surface 16 to bottom surface 18 and a plurality of upwardly facing loops 42 disposed at bottom surface 18 and ascending through face layer 12.

Suitable gathered structures include creped webs, microfolded webs, non-wovens, wovens, and knits. The structures also include webs, non-wovens, knits and wovens that are stitched with shrinkable yarns and post-shrunk to form folded structures. Suitable shrinkable yarns include stretched elastic yarns, partially oriented yarns, and flat, fully oriented yarns heated near the melting points of the yarns to cause the yarns to shrink. Polyolefin yarns are also suitable for shrinking 5-20° C. below their melting points. Face layer 12 can also include a plurality of secondary non-shrinking yarns (not shown) in contact with the stitching substrate. These secondary yarns can be stitched-in or laid-in yarns.

Figure 15:
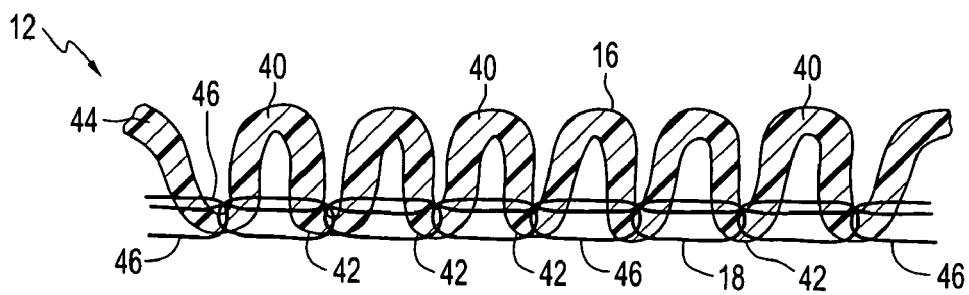
FIG. 15 is a schematic representation of a stichbonded fabric layer after gathering.
Figure 16:
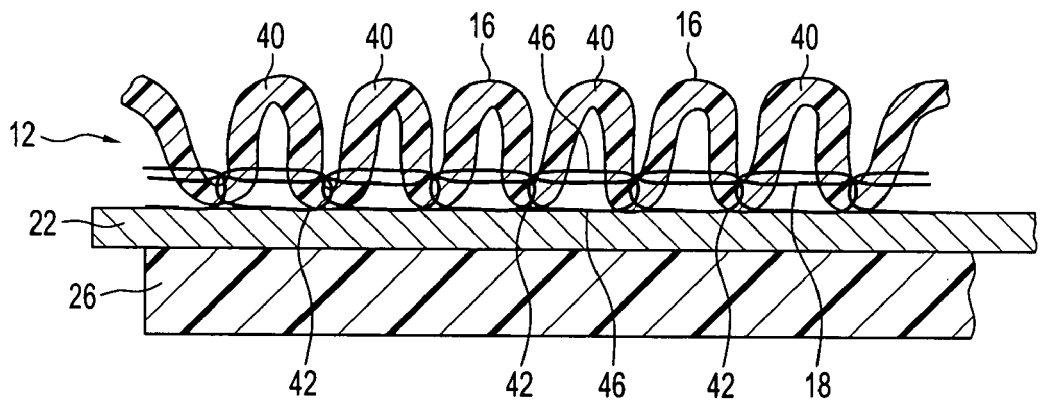
FIG. 16 is a schematic representation of a gathered stitchbonded fabric layer in combination with an adhesive layer and a backing layer before lamination.
Figure 17:
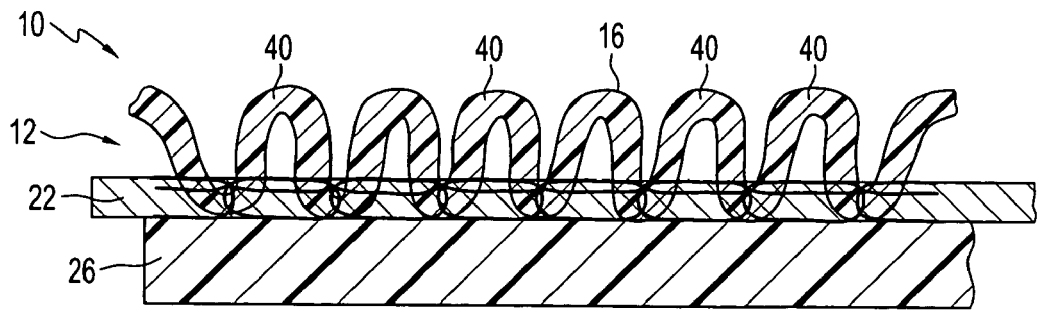
FIG. 17 is a schematic representation of a gathered stitchbonded fabric layer in combination with an adhesive layer and a backing layer after lamination.

As illustrated in FIG. 15, face layer 12 is a stitchbonded layer that includes a buckled stitching substrate 44 containing the plurality of fibers and a substantially planar network of shrinkable yarns 46 stitched to the stitching substrate. To produce a relatively smooth surface, the stitching frequency is relatively high in both directions (gauge and CPI), between about 6 stitches per inch and about 30 stitches per inch, preferably between about 10 stitches per inch and about 30 stitches per inch. In addition, face layer 12, before being folded or gathered, has a fabric basis weight ranging from about 25 gm/m² to about 150 gm/m². After folding and gathering, face layer has a fabric basis weight ranging from about 100 gm/m² to about 600 gm/m² and a folded frequency ranging from about 12 folds per inch to about 60 folds per inch. In addition, the thickness of face layer 12 is from about 0.5 mm to about 2 mm thick after folding.

Figure 18:
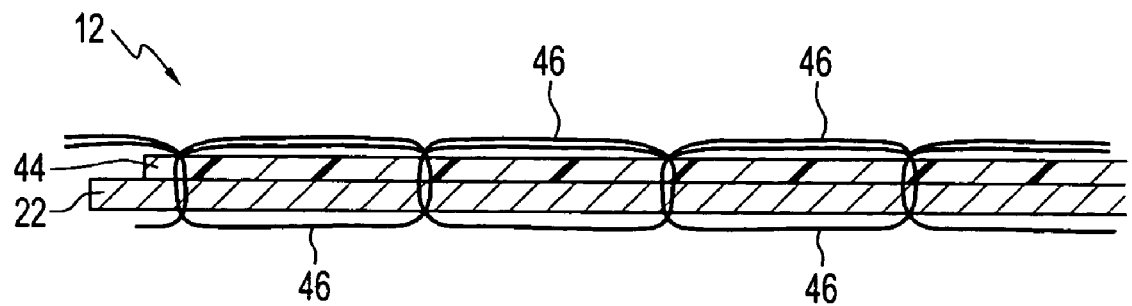
FIG. 18 is a schematic representation of a stichbonded fabric layer having an adhesive layer before gathering.
Figure 19:
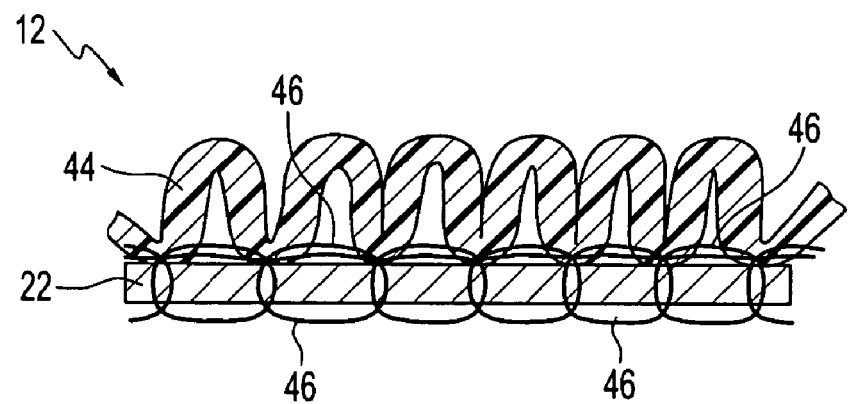
FIG. 19 is a schematic representation of a stichbonded fabric layer having an adhesive layer after gathering.

In an alternative embodiment as is illustrated in FIGS. 18-19, adhesive layer 22 can be integrated within the stitch-bonded structure of face layer 12. In this embodiment, adhesive layer 22 can be a shrinkable layer that assists in creating the gathered structure of face layer 12. Suitable adhesive layers include polyolefin films that shrink at about 130° C. to about 160° C. by a factor of about 1.3 to about 2.2 without melting. Suitable gathering frequencies and fabric weights for this arrangement are the same as for the embodiment illustrated in FIGS. 14 and 15. Suitable stitch-bonded structures of face layer 12 are disclosed in common owned, co-pending patent application entitled "Stitch-bonded and Gathered Composites and Methods for Making Same," by the same inventor as the present invention and filed on the same day as this patent application.

Figure 14:
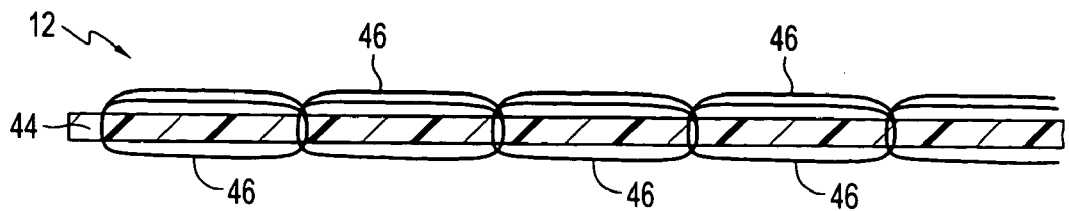
FIG. 14 is a schematic representation of a stitchbonded fabric layer before gathering.

In order to make the composite material 10 of the embodiment illustrated in FIGS. 14-17, stitching substrate 44 containing the plurality of fibers is selected and stitchbonded using shrinkable yarn 46 in accordance with the desired fabric weight and gathered density, FIG. 14. Shrinkable yarn 46 is then shrunk to produce the gathered fabric structure, FIG. 15. Adhesive layer 22 is then brought into contact with bottom surface 18 of gathered face layer 12 and embedded into face layer 12 to form a two-layer laminate. Adhesive layer 22 is embedded into face layer 12 by applying heat and pressure. Although adhesive layer 22 is preferably in direct contact with the technical bottom surface 18 of face layer 12, adhesive layer 22 may alternatively be placed in direct contact with the technical top surface 16 of face layer 12. If a three layer laminate is being made, backing layer 26 is brought into contact with adhesive layer 22 prior to application of the heat and pressure so that adhesive layer 22 also penetrates into backing layer 26, FIGS. 16 and 17.

Figure 20:
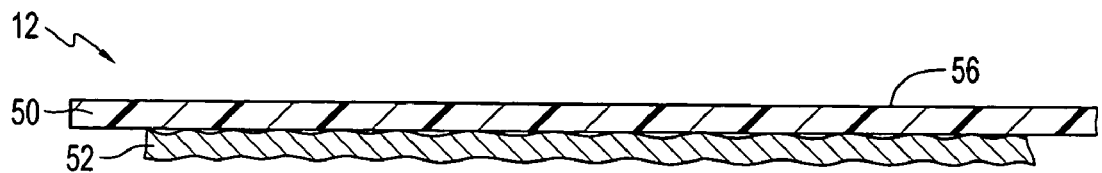
FIG. 20 is a schematic representation of a pattern bonded fabric layer before bonding and gathering.
Figure 21:
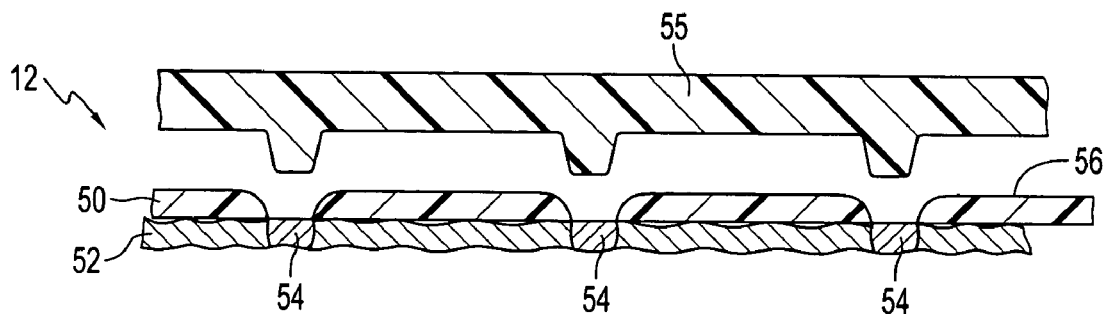
FIG. 21 is a schematic representation of a pattern bonded fabric layer after bonding and before gathering.

In another embodiment as illustrated in FIGS. 20-23, face layer 12 is a thin and dense gathered, pattern bonded layer containing face layer substrate 50 containing a plurality of fibers and shrinkable sublayer 52 attached or bonded to face layer substrate 50 with a spaced pattern of a plurality of discrete bonds 54, FIG. 21, placed at frequencies similar to the stitch frequencies of the embodiments illustrated in FIGS. 14-17. Heated pattern bonding tool 55 is used to produce bonds 54. Face layer 12 is a fibrous web or fabric having a total buckled thickness of from about 0.5 mm to about 2 mm. Shrinkable sublayer 52 is preferably relatively open to allow the penetration of the thermoplastic or thermoset adhesive from adhesive layer 22 into face layer 12. As with other embodiments of the present invention, thermoset or thermoplastic adhesives may benefit from the pre-application of adhesive layer 22 to one or both mating surfaces. Thermoplastic lamination may also benefit from preheating to accelerate the lamination process.

Figure 24:
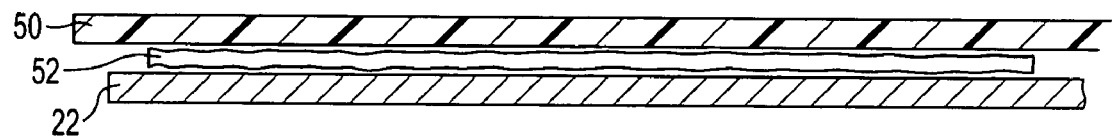
FIG. 24 is a schematic representation of a pattern bonded fabric layer having an adhesive layer before bonding and gathering.
Figure 25:
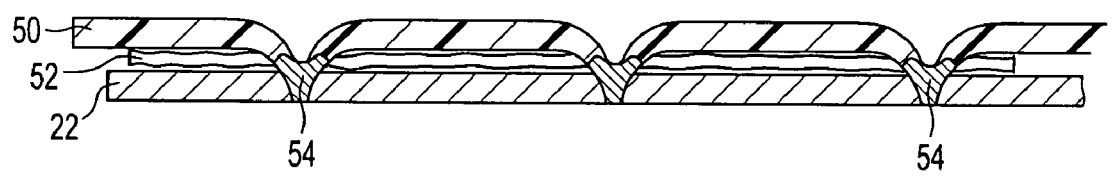
FIG. 25 is a schematic representation of a pattern bonded fabric layer having an adhesive layer after bonding and before gathering.
Figure 26:
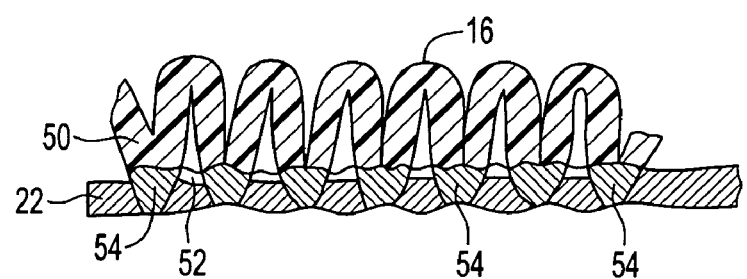
FIG. 26 is a schematic representation of a bonded and gathered pattern bonded fabric layer having an adhesive layer.

As shown in FIGS. 24-26, adhesive layer 22 can be integrated into the structure of face layer 12 before substrate 50 is bonded to shrinkable sublayer 52. In order to be integrated into face layer 12, adhesive layer 22 is placed in direct contact with shrinkable sublayer 52 such that shrinkable layer 52 is disposed between adhesive layer 22 and substrate 50, FIG. 24. In this embodiment, adhesive layer 22 is preferably a shrinkable layer. The three layers are then bonded together with the discrete bonds 54, FIG. 25. Following bonding, shrinkable sublayer 52 and, if applicable, adhesive layer 22 are shrunk to produce gathered face layer 12, FIG. 26.

In order to make the composite material in accordance with the arrangements illustrated in FIGS. 20-23, fibrous substrate 50 is selected and shrinkable substrate 52 placed in contact with fibrous substrate 50, FIG. 20. Fibrous substrate 50 and shrinkable substrate 52 are then bonded together in a pattern similar in frequency to those depicted in FIGS. 14-19 in accordance with the desired fabric weight and gathered density. Suitable methods for pattern bonding these layers together include applying heated pattern plate 55 containing the desired pattern to top surface 56 of substrate 50, FIG. 21. Shrinkable substrate 52 is then shrunk to produce the gathered face layer structure, FIG. 22. Adhesive layer 22 is then brought into contact with bottom surface 18 and embedded into face layer 12 for example by applying heat and pressure. If a three layer laminated is being made, backing 26 is brought into contact with adhesive layer 22 prior to application of the heat and pressure so that adhesive layer 22 also penetrates into backing layer 26, FIG. 23.

Figure 3:
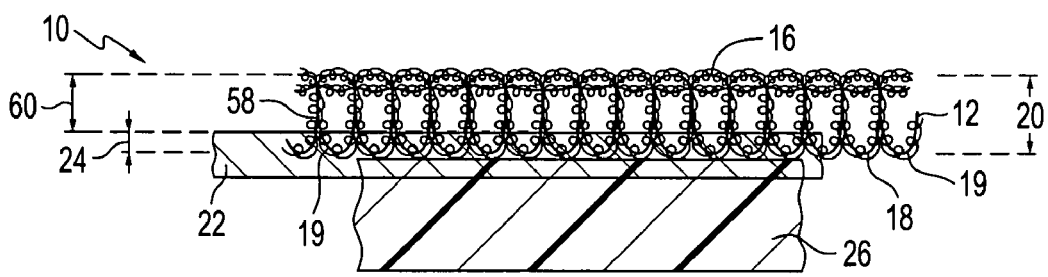
FIG. 3 is a schematic representation of another three layer embodiment of the composite material.
Figure 4:
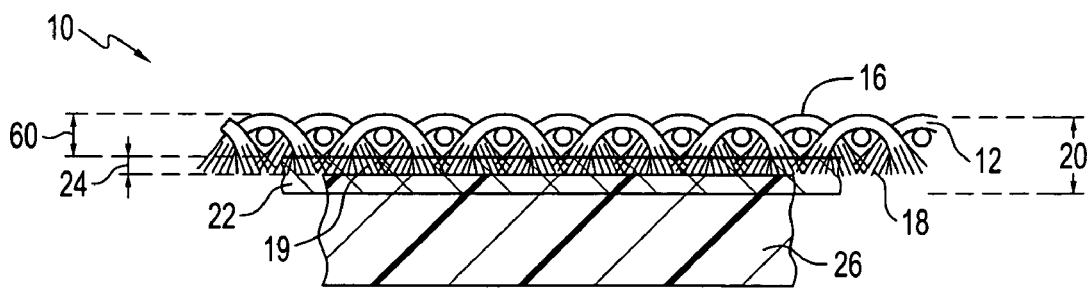
FIG. 4 is a schematic representation of another three layer embodiment of the composite material.

In another embodiment in accordance with the present invention as illustrated in FIG. 3, face layer 12 is a reversed knit or woven pile fabric layer. Suitable reversed knit or woven pile fabrics include those used to prepare velours or velvets. Pile side 58 of face layer 12 is sufficiently long to provide for adequate embedding of adhesive layer 22 into face layer 12 to stabilize face layer 12. Suitable fabrics have basis weights that range from about 4 oz/yd$^2$ to about 16 oz/yd$^2$, preferably about 6 oz/yd$^2$ to about 12 oz/yd$^2$ (about 200 gm/m$^2$ to about 400 gm/m$^2$). As in the case of surface layers 12 in accordance with the present invention, fabric face layer 12 provides a durable and decorative surface that utilizes finer and softer fibers that can be applied over backing layer 26 containing lower-cost, stiffer fibers to provide cushion, body, and dimensional stability.

In order to make composite material 10 in accordance the embodiment of FIG. 3, knit or woven pile fabric face layer 12 is selected and adhesive layer 22 is brought into direct contact with bottom surface 18 of face layer 12. Adhesive layer 22 is then embedded into fabric face layer 12, for example by the application of heat and pressure. If a three layer arrangement is desired, backing layer 26 is brought into direct contact with adhesive layer 22 before adhesive layer 22 is embedded into fabric face layer 12 so that adhesive layer 22 will also embed or penetrate into backing layer 26.

Figure 27:
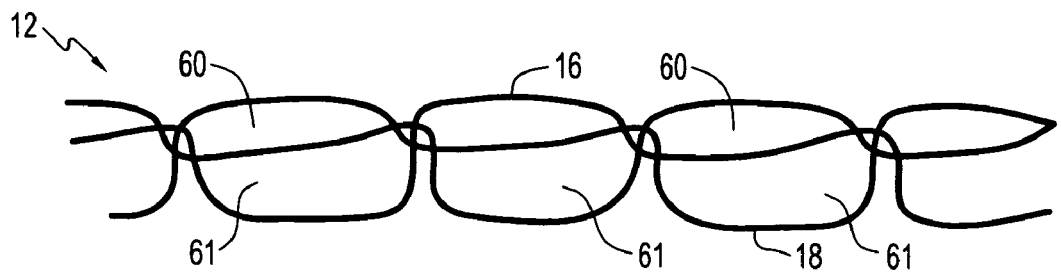
FIG. 27 is a schematic representation of a reversed pile knit fabric for use in the present invention.
Figure 28:
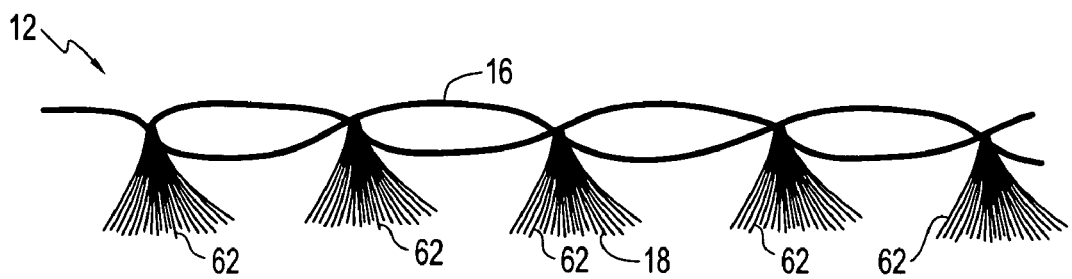
FIG. 28 is a schematic representation of a reversed pile knit fabric having cut and raised free fiber ends for use in the present invention.

Referring to FIGS. 27 and 28, when face layer 12 is a knit fabric, face layer 12 contains a plurality of overlaps 60 on top surface 16 and a plurality of underlaps 61 on bottom surface 18. In order to provide for stronger bonding between knit fabric face layer 12 and adhesive layer 22, underlaps 61 can be cut, sanded, brushed or sheared at bottom surface 18 to produce a plurality of cut and raised fibers 62. When laminated to adhesive layer 22, adhesive layer 22 will embed into fabric face layer 12 throughout the area of cut and raised fibers 62. This embodiment utilizes many different kinds of knits. Suitable knits contain underlap loops 61 that can be cut and raised on back surface 18 without affecting the texture of top surface 16.

Figure 29:
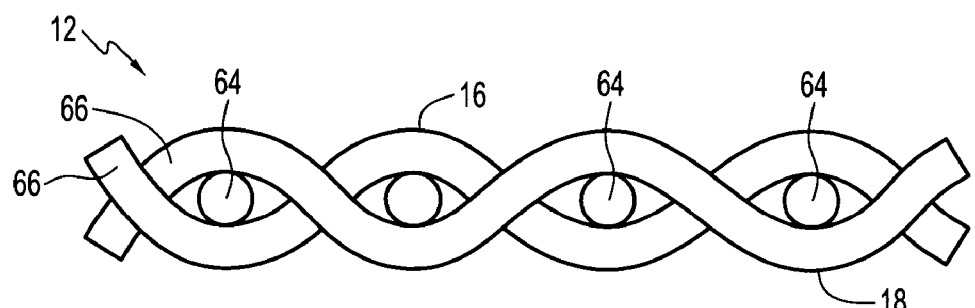
FIG. 29 is a schematic representation of a woven fabric for use in the present invention.
Figure 30:
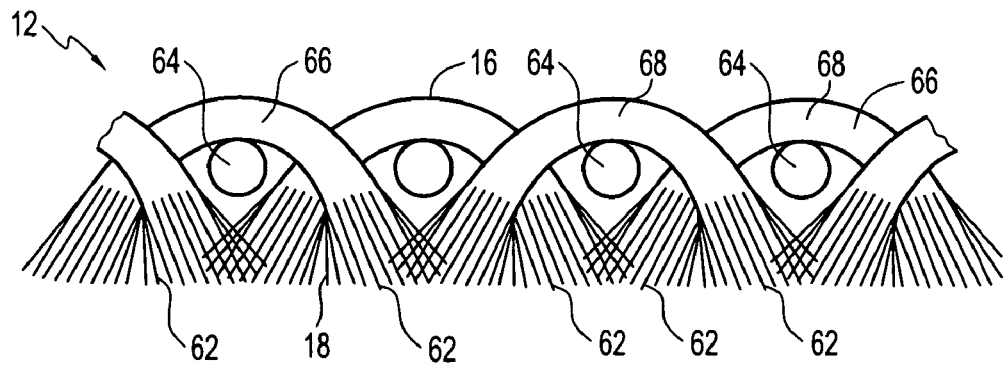
FIG. 30 is a schematic representation of a woven fabric having cut and raised free fiber ends for use in the present invention.

Referring to FIGS. 29 and 30, face layer 12 contains a woven fabric having a plurality of warp yarns 64 and a plurality of weft yarns 66. Weft yarns 66 have been cut, sanded, brushed or sheared on one surface of woven fabric face layer 12 in a manner that leaves yarn overlaps 68 of interconnecting warp yarns 64 intact and produces a plurality of cut and raised fibers 62 at bottom surface 18.

In order to make a composite material in accordance with the embodiments illustrated in FIGS. 27-30, a knit or woven face layer 12 is selected and the pile loop side for the knit fabric or one side of the woven fabric is sanded or cut to produce cut and raised fibers 62. Adhesive layer 22 is then brought into direct contact with cut and raised fibers 62 and embedded into face layer 12. Adhesive layer 22 can be embedded by the application of pressure and heat. If a three layer embodiment is desired, backing layer 26 is brought into contact with adhesive layer 22 before adhesive layer 22 is embedded into face layer 12 so that adhesive layer 22 will also penetrate into backing layer 26.

Since knit or woven face layer 12 is being cut or abraded, which weakens the structural integrity of the fabric, face layer 12 can be stabilized before being cut or sanded to assist in preserving the knit or woven structure during cutting or shearing. Stabilization or immobilization can be achieved by attaching a stabilizing sheet or a temporary layer of adhesive to top surface 16 prior to cutting, sanding or abrading bottom surface 18. Following cutting, lamination of face layer 12 to the other layers can be performed with the face stabilizer left in place or removed.

Figure 31:
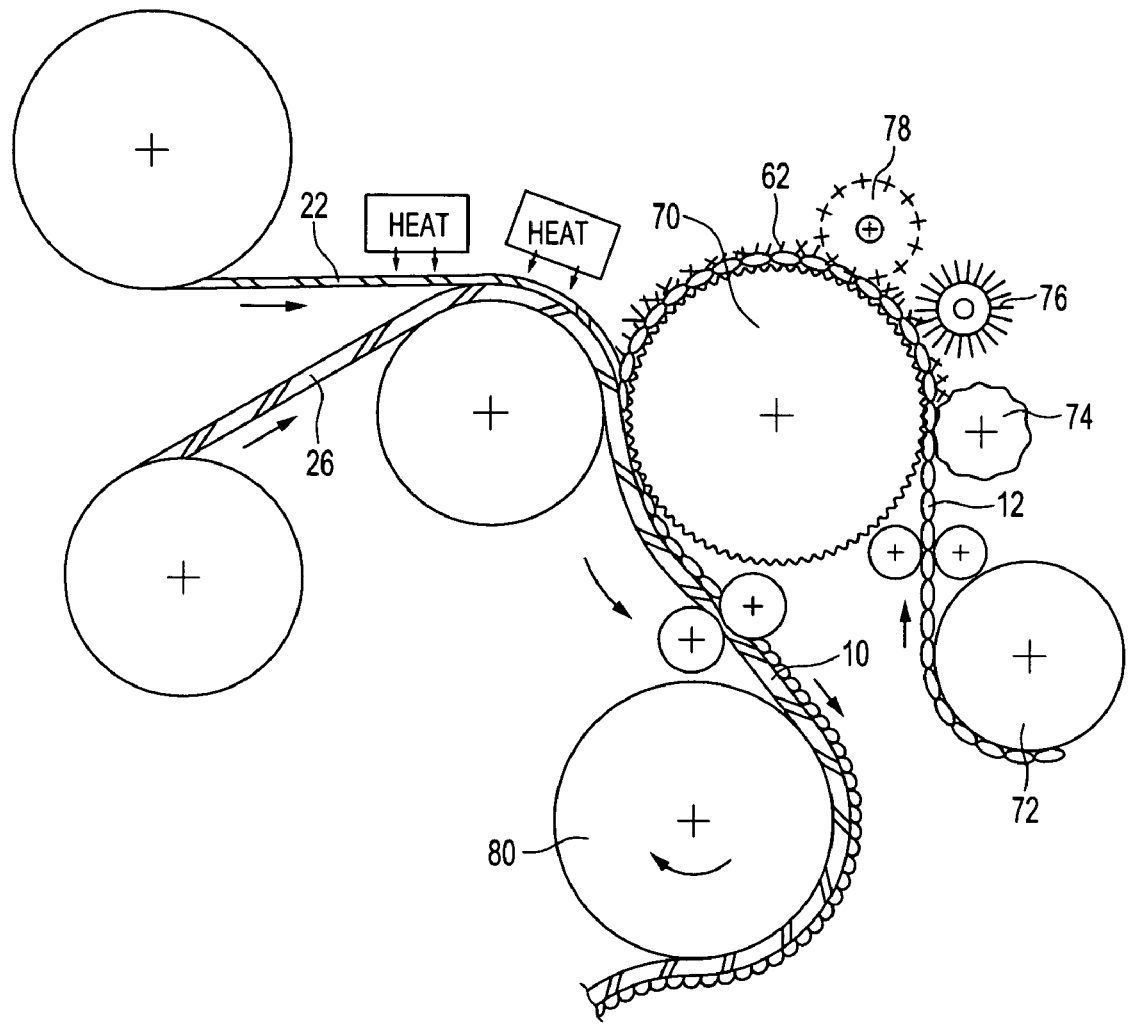
FIG. 31 is a schematic representation of an embodiment of an apparatus for stabilizing a woven or knit face layer during cutting and raising of fibers.
Figure 32:
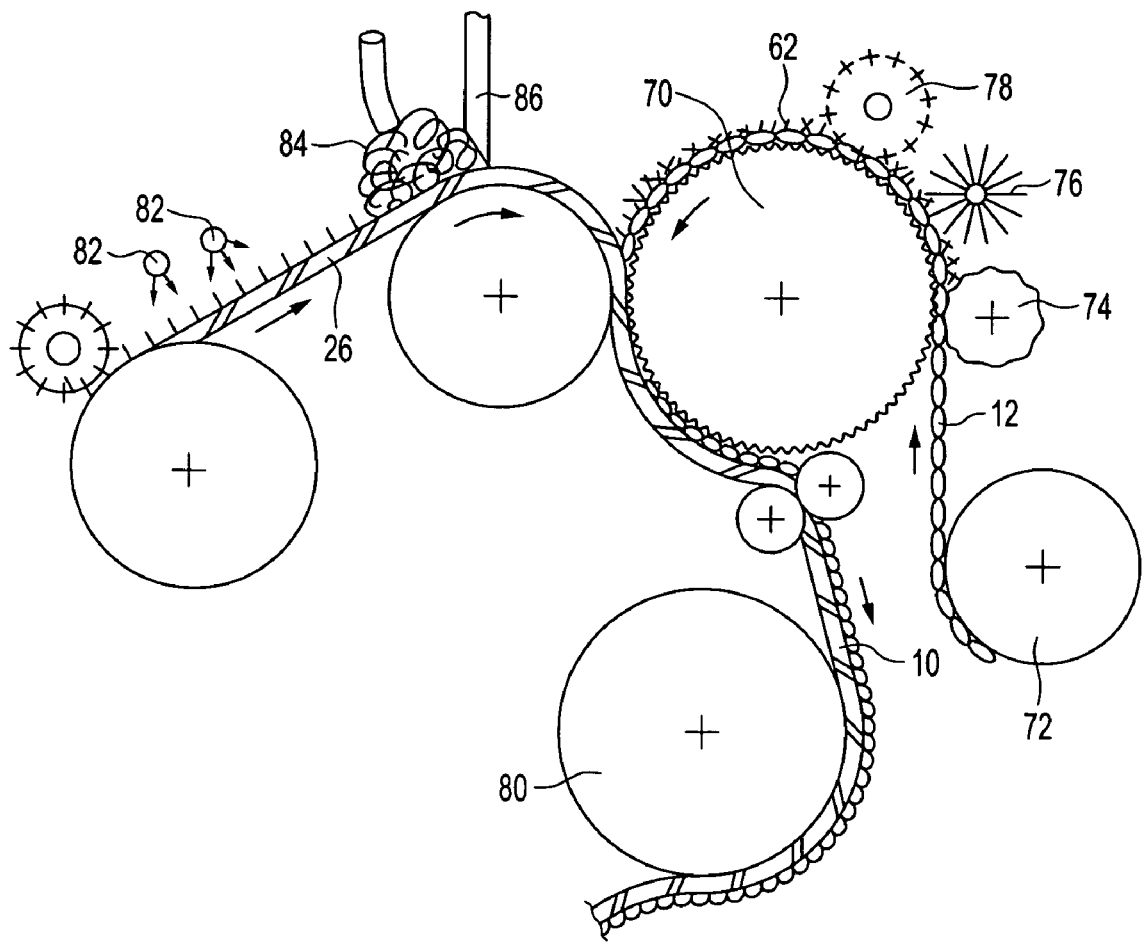
FIG. 32 is a schematic representation of another embodiment of an apparatus for stabilizing a woven or knit face layer during cutting and raising of fibers.

In another embodiment of stabilizing face layer 12 as illustrated in FIGS. 31 and 32, face layer 12 can be stabilized on high friction roller 70. As illustrated, a continuous feed of face layer 12 from face layer roll 72 is introduced onto high friction roller 70. Face layer 12 is then exposed to sanding roller 74, brushing roller 76 or napping roller 78 producing cut and raised fibers 62 while stabilizing top surface 16. Backing layer 26 and adhesive layer 22 are brought into contact with each other and heated and then laminated to face layer 12 while face layer 12 is still immobilized on high friction roller 70. Optionally, roller 70 may be heated. The finished composite material is then collected on take-up roller 80. Adhesive layer 22 can be introduced as a continuous sheet, FIG. 31, applied to backing layer 26 using a spray heads 82, FIG. 32, or applied to backing layer 26 as a foam 84 that is then doctor knifed 86 to the desired thickness, FIG. 32.

EXAMPLES

Example 1

A blend of 80% 1.5 denier 1.5 inch polyester fibers and 20% 1.5 denier 1.5 inch polypropylene fibers is carded and lapped into a structure weighing approximately 8 oz/sq.yd. This face layer is then needled from one side only with 1,500 penetrations/sq.in. forming a dense surface and a very fur-like backface with many free ends and loops, as shown in FIG. 6.

A second blend of 80% 15 denier, 1.5 inch cut polyester and 20% 1.5 denier 1.5 cut polypropylene fiber is carded and lapped into a 24 oz/sq.yd. batt and needled with 300 penetrations per square inch from one face to form the backing layer.

A dual layer of 0.05 inch thick polyethylene utility films is placed between the face layer and the backing layer, with the needled sides of the face layer and the backing on the outside and pressed with a plate heated to about 200 degrees C. placed against the face layer, at 1000 psi for 3 seconds. The plate facing the backing is at room temperature. The product is solidly laminated with all free fiber ends embedded in the molten polyethylene. Adhesive penetrates the two layers, but leaves a thickness of face layer approximately 1 mm thick free of adhesive. Delamination cannot be achieved without damage to the face or backing layers. The surface is smooth, durable and traffic-wear resistant with a textile feel and improved edge-fraying resistance.

Example 2

The face layer of Example 1 is needled into the adhesive layer before laminating onto the backing layer. The stability of the surface is superior to Example 1. Delamination without destroying the layers is even more difficult. The surface is fibrous, smooth, free of adhesive and traffic-wear and edge-fraying resistant. The fibrous height above the adhesive penetration is approximately 0.9 mm.

Example 3

The needled face layer of Examples 1 and 2 is needled directly through the dual adhesive layer and into the backing (FIG. 12) before the hot pressing process. The product has a textile feel and excellent durability and is delamination resistant.

Example 4

A non-woven fabric containing commercial polyester Sontarao® spunlaced Style 8034 (20 g/m$^2$), sold by E. I. DuPont de Nemours, is stitched with P.O.Y. polyester yarn (155 denier/34 filament) using a stitch pattern of 1,0/3,4 at 14 gauge and 12 cpi. After stitching the product is subjected to 190 degrees C. for 30 seconds within a tentering frame, allowing it to shrink by a ratio of 1.7/1 both in the machine and cross directions. It forms a thin and dense undulated folded fabric structure as shown in FIG. 15. This fabric is placed over the dual layers of adhesive and backing of Example 1 and laminated as described in Example 1. The composite is very stable and traffic-wear resistant and has a textile feel with improved resistance to edge-fraying. Loop density is approximately 22/inch in both directions and loop height above the adhesive penetration is approximately about 1 mm.

Example 5

The stitching bonding step for the face layer of Example 4 is repeated with an additional layer of 5.5 mil thick polyethylene adhesive film placed over the Sontara® nonwoven. After shrinking by a ratio of 1.6/1 in both directions by subjecting it to 150 degrees C. for 30 seconds within a frame, a buckled face layer containing an added layer of polyethylene on its technical back is produced (FIG. 19). The composite is laminated to the backing of Example 1 under the same conditions with the same excellent results.

Example 6

In this example, a folded layer produced by shrinking a dual shrinkable/non-shrinkable laminate is illustrated. A buckled face layer is constructed by intermittently "tacking" a layer of Style 8003 spunlaced non-woven polyester Sontarag (1.9 oz/yd$^2$ or about 50 gm/m$^2$) to a shrinkable sublayer consisting of a carded web of polypropylene staple weighing 30 gm/m$^2$. The bonding pattern consists of elevated lines 0.5 mm thick extending across every 2 mm. Tacking is preformed using a heated patterned plate that is heated to 200 degrees C. and placed on the polyester side using 1000 psi for about 2 seconds. The polypropylene side rests against a room temperature steel plate.

Figure 22:
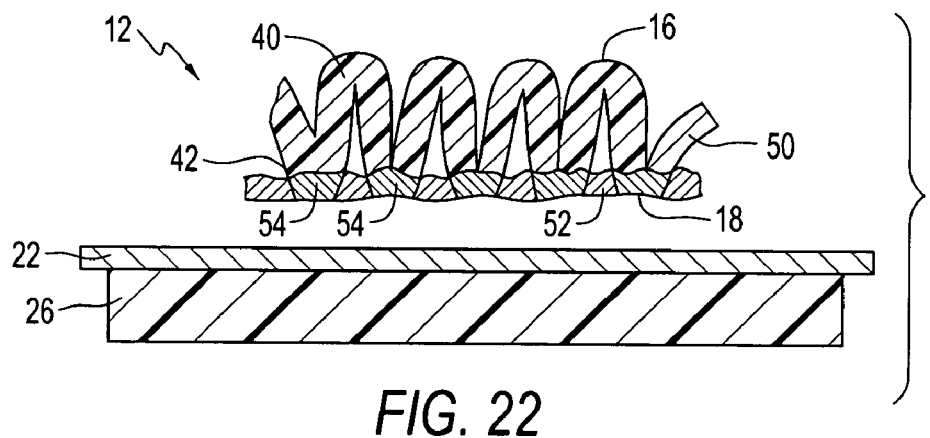
FIG. 22 is a schematic representation of a gathered pattern bonded fabric layer in combination with an adhesive layer and a backing layer before lamination.
Figure 23:
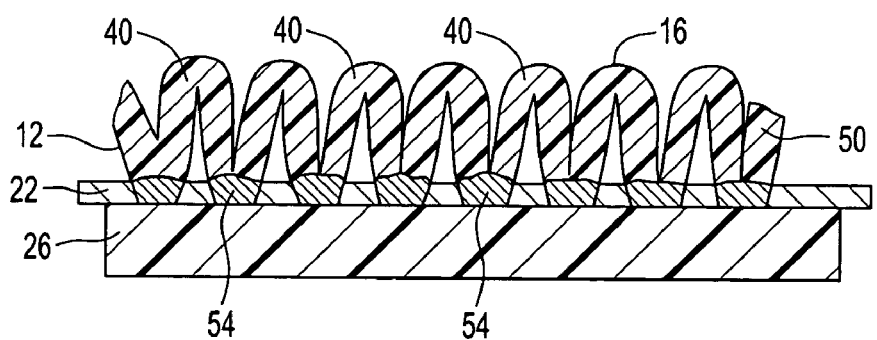
FIG. 23 is a schematic representation of a gathered pattern bonded fabric layer in combination with an adhesive layer and a backing layer after lamination.

Upon heating the composite to 150 degrees C., the polypropylene layer shrinks to approximately 67% of its initial length, producing an undulated structure (FIG. 22). This undulated face layer is placed over a dual layer of 5.5 mil thick polyethylene over the same backing used in Examples 1 and pressed in the same manner to produce a very coherent laminate with a textile feel, and improved edge-fraying resistance.

Example 7

In this example, a folded layer containing a shrinkable adhesive layer, produced by pattern bonding and shrinking is illustrated. The process of Example 6 is repeated with a layer of polyethylene adhesive placed under the spunlaced sheet before tacking to the shrinkable backing (FIG. 24). The assembly is pretacked and shrunk at 150 degrees C. to produce the composite face and adhesive layer.

Subjecting this composite face/adhesive layer to the same lamination process in Example 6 over the same backing resulted in excellent adhesion, surface stability and edge fraying resistance.

Example 8

In this example, a face layer consisting of commercial velour knit is applied with the pile face down against the adhesive layer. A commercial knit nylon velour fabric that was 1.1 mm thick and weighed 12.8 oz/yd$^2$ was laminated to the backing described above using the 5.5 mil polyethylene film described above, by pressing from one face only with a platen at 200 degrees C. for 1 second with the pile facing the adhesive film. Fabric thickness above the adhesive penetration line was approximately 0.9 mm. Excellent adhesion, surface stability and textile hand resulted. The product was highly resistant to edge fraying.

Example 8A (Prior Art)

The velour knit was laminated with the pile face up. Adhesion and edge fraying resistance were not achieved until pressure and time were increased over 3 seconds with some adhesive rising near the top of the face layer. This example is outside the scope of the present invention.

Example 9 (Prior Art)

This example illustrates how a commercial cotton denim fabric that does not respond well to thermoplastic lamination can be converted to produce high-performance composite in accordance with the present invention.

A commercial woven cotton fabric weighing 12.8 oz/yd$^2$ was laminated to the backing described above using the dual polyethylene films described above in a heated press. Top surface temperature was varied between 180 and 230 degrees C. Pressure at each step was varied between 150 and 10,000 psi, and the pressing time at each temperature combination was between about 0.5 and about 3 seconds. Lamination without relative ease of delamination was not achieved without penetrating the woven with polyethylene adhesive in spots or over the entire surface area. Surface stability versus traffic wear resistance also could not be achieved unless the adhesive resin rose to the top of the face layer. The cut edges of this composite frayed easily. This example is also outside the scope of the present invention.

Example 10

The cotton woven mentioned in Example 9 was prestabilized by prelaminating onto commercial pressure sensitive Duct Tape. The stabilized product was held on a table top and hand sanded on the opposing face using a pad of 150 grit sandpaper until a uniform shade change indicated that practically all of the originally exposed yarns underneath were cut, and the face fabric assumed a highly open velvet-like surface. The fabric was then laminated onto the backing used in the above examples using a single layer of polyethylene, and pressing at 10,000 psi with the top plate heated to 180 degrees C. for 3 seconds. The pressure sensitive tape was removed, with minimal tape adhesive contamination remaining in a few spots on the surface. Excellent lamination, without a tendency to fray at cut edges and with an adhesive-free textile surface was achieved. The product had excellent surface stability versus traffic-wear resistance. The cut edges were highly resistant to fraying.

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A composite comprising: (A) a fibrous face layer having a top surface and a bottom surface, (B) a solid adhesive film or solid adhesive fabric, and (C) a backing layer;
    wherein the bottom surface of the fibrous face layer faces the solid adhesive film or adhesive fabric,
    wherein the fibrous face layer comprises a non-woven fabric needled-punched to form a plurality of legs,
    wherein the legs are made from a portion of the fibrous face layer and the legs are extending away from the top surface of the fibrous face layer and through the bottom surface of the fibrous face layer,
    wherein the legs of the fibrous face layer are needle-punched through the face layer, and at least some of the legs are needled through the solid adhesive film or adhesive fabric and are thermally bonded to the adhesive film or adhesive fabric,
    wherein a portion of the adhesive in the adhesive film or adhesive fabric at least partially penetrates into the fibrous face layer and wherein the top surface of the fibrous face layer is substantially free of adhesive, and
    wherein at least some of the needle-punched legs are bonded to the backing layer.

2. The composite of claim 1, wherein the legs of the fibrous face layer are further bonded in the adhesive layer by an application of pressure.

3. The composite of claim 1, wherein the fibrous face layer comprises fibers of about 0.5 denier to about 5.0 deniers.

4. The composite of claim 1 wherein at least some of the legs are needle-punched into the backing layer.

5. The composite of claim 1, wherein a top portion of the fibrous face layer above the top of the adhesive layer has a thickness of about 0.5 mm to about 2.0 mm.

6. The composite of claim 1, wherein a top portion of the fibrous face layer above the top of the adhesive layer has a basis weight of about 100 grams/m$^2$ to about 500 grams/m$^2$.

7. The composite of claim 1, being embossable to form a three-dimensional textured product.

8. The composite of claim 1, wherein the needling density is at least 500 ppsi.

9. The composite of claim 8, wherein the needling density is at least 1,000 ppsi.

10. The composite of claim 1, wherein the face layer is spunlaced.

11. The composite of claim 10, wherein the face layer is spunlaced substantially from the top surface.

12. A method for making a composite, the method comprising:
    (i) selecting a fibrous face layer comprising a plurality of fibers, wherein the face layer has a top surface and a bottom surface opposite the top surface;
    (ii) after the fibrous face layer is formed, placing an adhesive layer having a top surface and a bottom surface opposite the top surface, wherein the top surface of the adhesive layer is in direct contact with the bottom surface of the fibrous face layer;
    (iii) needle-punching the face layer to form a plurality of legs made from a portion of the fibrous face layer wherein the legs are extending away from the top surface of the fibrous face layer and into the adhesive layer;
    (iv) embedding the legs of the fibrous face layer in the adhesive layer, wherein the adhesive layer penetrates a distance of about ¼ to about ¾ of the thickness of the fibrous face layer to anchor the face layer in the adhesive layer; and
    (v) presenting the substantially adhesive free top surface of the fibrous face layer as a top surface of the composite.

13. The method of claim 12, further comprising spunlacing the face layer to produce the plurality of legs, the plurality of legs comprising a plurality of free fiber ends at the bottom surface.

14. The method of claim 12, wherein the step of embedding the adhesive layer comprises:
    activating the adhesive layer; and
    applying pressure to the top surface of the face layer.

15. The method of claim 12, wherein the step of selecting a face layer comprises selecting a fibrous substrate, placing a shrinkable substrate in contact with the fibrous substrate, bonding the fibrous substrate to the shrinkable substrate at a plurality of discrete locations and shrinking the shrinkable layer to form a gathered fabric structure to form the plurality of legs corresponding the undulating loops of the gathered fabric structure.

16. The method of claim 12, further comprising embossing the composite with a 3-dimensional face texture.

17. The method of claim 12 further comprising the step of using the composite as a wall or floor covering.

18. The method of claim 12, further comprising placing a backing layer in direct contact with the bottom surface of the adhesive layer such that the adhesive layer is disposed between the backing layer and the face layer.

19. The method of claim 18, wherein step (iii) comprises needle punching at least some of the plurality of legs completely through the adhesive layer and into the backing.

20. The method of claim 12, wherein the step of selecting a face layer comprises selecting a stitching substrate comprising the plurality of fibers, stitch bonding the substrate using a shrinkable yarn, and shrinking the yarn to produce a gathered fabric structure to form the plurality of legs corresponding the undulating loops of the gathered fabric structure.

21. The method of claim 20, wherein the adhesive layer is a shrinkable adhesive layer that is attached to the substrate before stitchbonding and shrinking.

22. The method of claim 12, wherein the face layer comprises a knit face layer and the method further comprises cutting the bottom surface of the face layer to produce the plurality of legs.

23. The method of claim 22, further comprising stabilizing the top surface of the face layer before cutting the bottom surface.

24. The method of claim 12, wherein the face layer comprises a woven face layer and the method further comprises cutting the bottom surface of the face layer to produce the plurality of legs.

25. The method of claim 24, further comprising stabilizing the top surface of the face layer before cutting the bottom surface.

* * * * *